United States Patent [19]
Horton

[11] Patent Number: 5,957,767
[45] Date of Patent: Sep. 28, 1999

[54] ADJUSTABLE MEAT TENDERIZER

[76] Inventor: Clarence Horton, 2798 Luther Dr., East Point, Ga. 30344-2315

[21] Appl. No.: 09/074,167

[22] Filed: May 7, 1998

[51] Int. Cl.⁶ .................................................. A22C 9/00
[52] U.S. Cl. ............................................. 452/142
[58] Field of Search ................................. 452/142, 143, 452/144, 141

[56] References Cited

U.S. PATENT DOCUMENTS

| | | | |
|---|---|---|---|
| 611,789 | 10/1898 | Milne et al. ............................ | 452/142 |
| 2,453,334 | 11/1948 | Morgan .................................. | 452/142 |
| 2,606,341 | 8/1952 | Dolan ..................................... | 452/142 |
| 3,347,679 | 10/1967 | Nordin .................................... | 452/142 |
| 4,313,463 | 2/1982 | Greenspan ............................. | 452/142 |
| 5,340,354 | 8/1994 | Anderson et al. ..................... | 452/142 |

*Primary Examiner*—Willis Little

[57] ABSTRACT

A meat tenderizing apparatus is provided including a base and an upper roller assembly each with a roller rotatably coupled thereto, wherein the rollers rotate about separate axes with a distance therebetween which is adjustable.

7 Claims, 3 Drawing Sheets

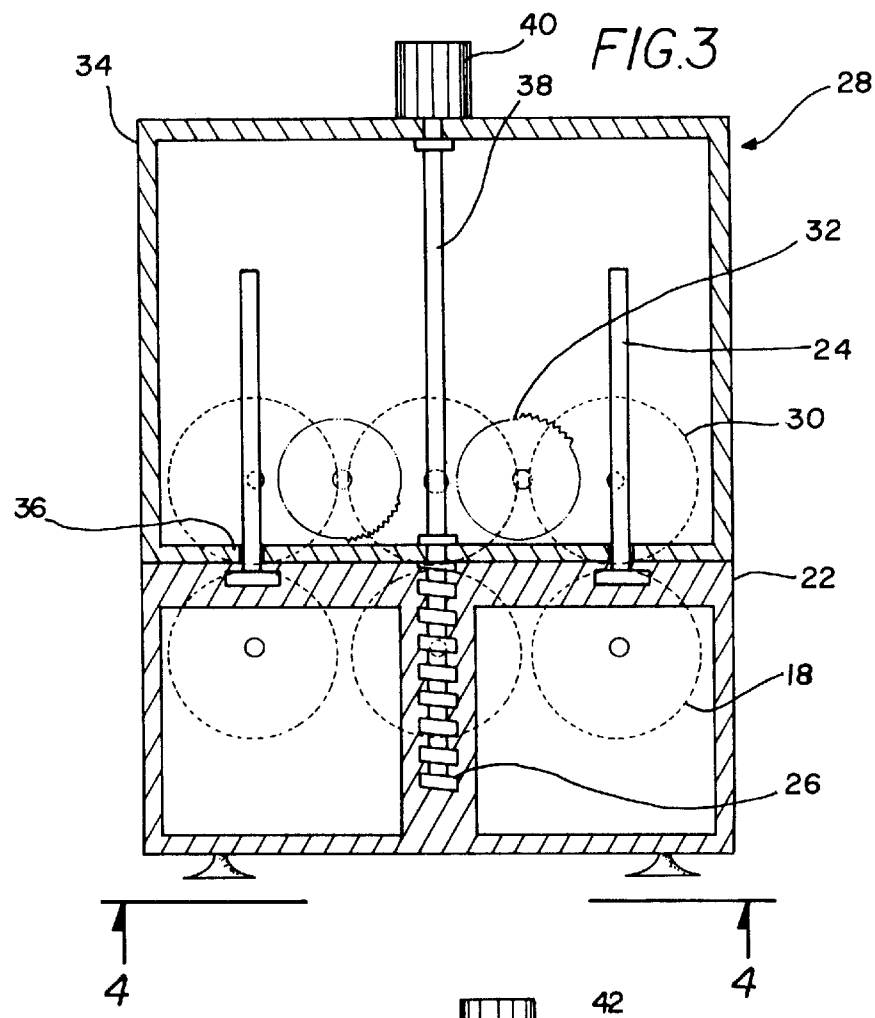
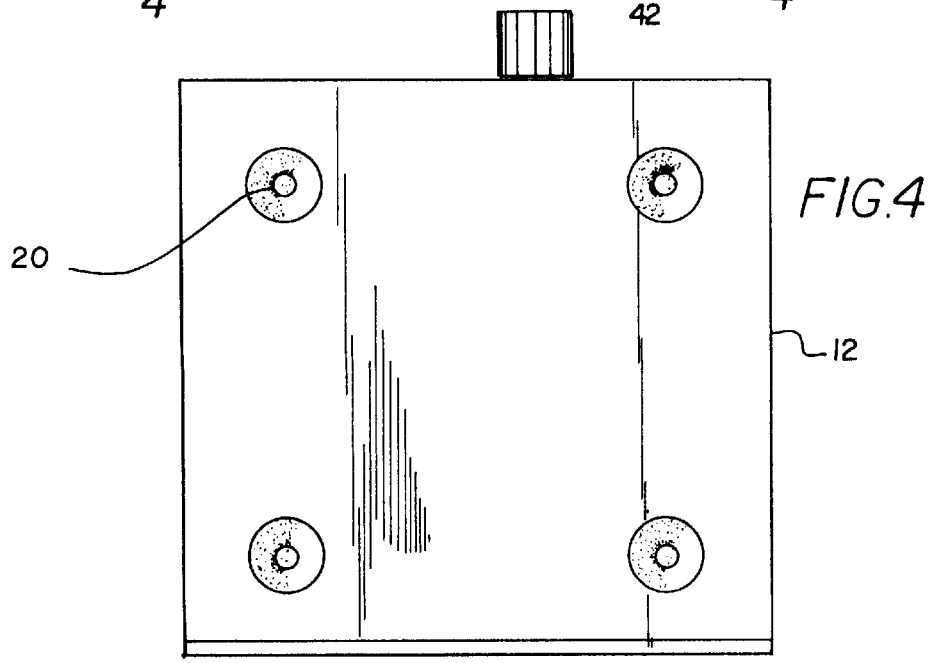

ADJUSTABLE MEAT TENDERIZER

BACKGROUND OF THE INVENTION

1. Field of the Invention

The present invention relates to meat tenderizers and more particularly pertains to a new adjustable meat tenderizer for tenderizing pieces of meat of varying thickness.

2. Description of the Prior Art

The use of meat tenderizers is known in the prior art. More specifically, meat tenderizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art meat tenderizers include U. S. Pat. No. 5,340,354; U.S. Pat. No. 5,085,482; U.S. Pat. No. 116,166; U.S. Pat. No. 4,672,716; U.S. Pat. No. 3,230,578; and Foreign Patents EP 0 451 025 A1 and WO 94/18842.

In these respects, the adjustable meat tenderizer according to the present invention substantially departs from the conventional concepts and designs of the prior art, and in so doing provides an apparatus primarily developed for the purpose of tenderizing pieces of meat of varying thickness.

SUMMARY OF THE INVENT ION

In view of the foregoing disadvantages inherent in the known types of meat tenderizers now present in the prior art, the present invention provides a new adjustable meat tenderizer construction wherein the same can be utilized for tenderizing pieces of meat of varying thickness.

The general purpose of the present invention, which will be described subsequently in greater detail, is to provide a new adjustable meat tenderizer apparatus and method which has many of the advantages of the meat tenderizers mentioned heretofore and many novel features that result in a new adjustable meat tenderizer which is not anticipated, rendered obvious, suggested, or even implied by any of the prior art meat tenderizers, either alone or in any combination thereof.

To attain this, the present invention generally comprises a base having a rectangular configuration with a bottom face and a rectangular side wall. The side wall is coupled to a periphery of the bottom face and extends upwardly therefrom for defining an interior space and an open top. Further, the side wall is formed of a pair of elongated side faces and a pair of short end faces. The base includes a plurality of cylindrical rollers rotatably coupled between the side faces of the side wall. As such, the rollers of the base remain in a parallel side-by-side relationship and extend slightly above the open top of the base. As shown in FIG. 5, each roller is lined with a plurality of tenderizing blades. As shown in FIG. 4, the base further includes a suction cup coupled on each of four bottom corners thereof. The suction cups function for securing the base to a horizontal recipient surface. With reference now to FIG. 2, a mounting block is shown to be integrally coupled to an upper edge of one of the side faces and further extended upwardly therefrom. The mounting block has a pair of vertically oriented posts coupled to a top face thereof and extending upwardly therefrom. For reasons that soon will become apparent, a threaded bore is formed in the top face of the mounting block between the posts. Next provided is an upper roller assembly having a rectangular configuration with a top face and a rectangular side wall coupled to a periphery of the top face. Such side wall depends from the top face for defining an interior space and an open bottom. Further, the side wall of the upper roller assembly is defined by a pair of elongated side faces and a pair of short end faces, similar to that of the base. The upper roller assembly also includes a plurality of cylindrical rollers rotatably coupled between the side faces of its side wall. The rollers of the upper roller assembly remain in a parallel side-by-side relationship and rotate coincidentally. As shown in FIG. 1, the rollers of the upper roller assembly depend slightly below the open bottom of the upper roller assembly. Similar to the rollers of the base, each of the present rollers are lined with a plurality of tenderizing blades. As best shown in FIGS. 2&3, the upper roller assembly further includes a control unit with a rectangular housing mounted on one of the side faces of the upper roller assembly. This housing has a pair of apertures formed therein for slidably receiving the posts of the base. By this structure, the upper roller assembly is maintained above the base. A vertical adjustment rod is rotatably coupled between a top face and a bottom face of the housing. Such vertical rod is equipped with a lower threaded extent that extends through the bottom face. As shown in FIG. 3, this threaded lower extent is adapted for screwably engaging the threaded bore of the base which in turn allows the rollers of the upper roller assembly to be selectively raised lowered with respect to those of the base. This is accomplished by the rotation of a first dial coupled to the rod and extends upwardly from the top face of the housing. The upper roller assembly further includes a second dial in communication with at least one of the rollers of the upper roller assembly for rolling the same. In use, a piece of meat that is situated between the rollers of the base and the upper roller assembly may be tenderized.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new adjustable meat tenderizer apparatus and method which has many of the advantages of the meat tenderizers mentioned heretofore and many novel features that result in a new adjustable meat tenderizer which is not anticipated, rendered obvious, suggested, or even implied by any of the prior art meat tenderizers, either alone or in any combination thereof.

It is another object of the present invention to provide a new adjustable meat tenderizer which may be easily and efficiently manufactured and marketed.

It is a further object of the present invention to provide a new adjustable meat tenderizer which is of a durable and reliable construction.

An even further object of the present invention is to provide a new adjustable meat tenderizer which is susceptible of a low cost of manufacture with regard to both materials and labor, and which accordingly is then susceptible of low prices of sale to the consuming public, thereby making such adjustable meat tenderizer economically available to the buying public.

Still yet another object of the present invention is to provide a new adjustable meat tenderizer which provides in the apparatuses and methods of the prior art some of the advantages thereof, while simultaneously overcoming some of the disadvantages normally associated therewith.

Still another object of the present invention is to provide a new adjustable meat tenderizer for tenderizing pieces of meat of varying thickness.

Even still another object of the present invention is to provide a new adjustable meat tenderizer that includes a base and an upper roller assembly each with a roller rotatably coupled thereto, wherein the rollers rotate about separate axes with a distance therebetween which is adjustable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side cross-sectional view of the present invention taken along line 3—3 shown in FIG. 2.

FIG. 4 is a bottom view of the present invention.

DESCRIPTION OF THE PREFERRED EMBODIMENT

Figure 1:
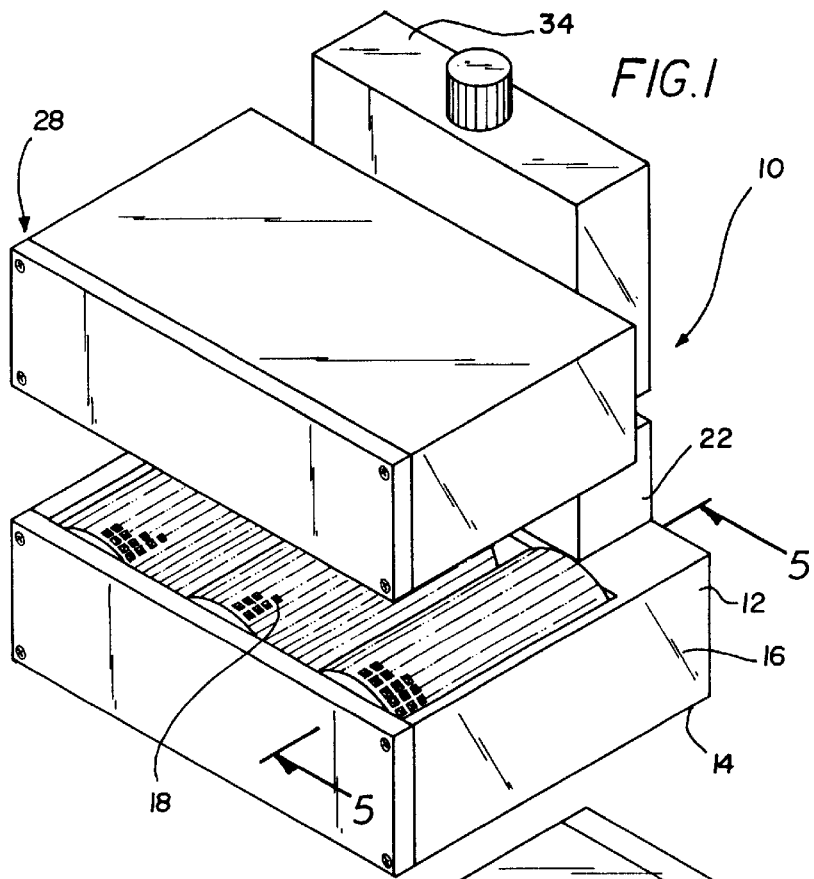
FIG. 1 is a front perspective view of a new adjustable meat tenderizer according to the present invention.

With reference now to the drawings, and in particular to FIGS. 1 through 6 thereof, a new adjustable meat tenderizer embodying the principles and concepts of the present invention and generally designated by the reference numeral 10 will be described.

Figure 5:
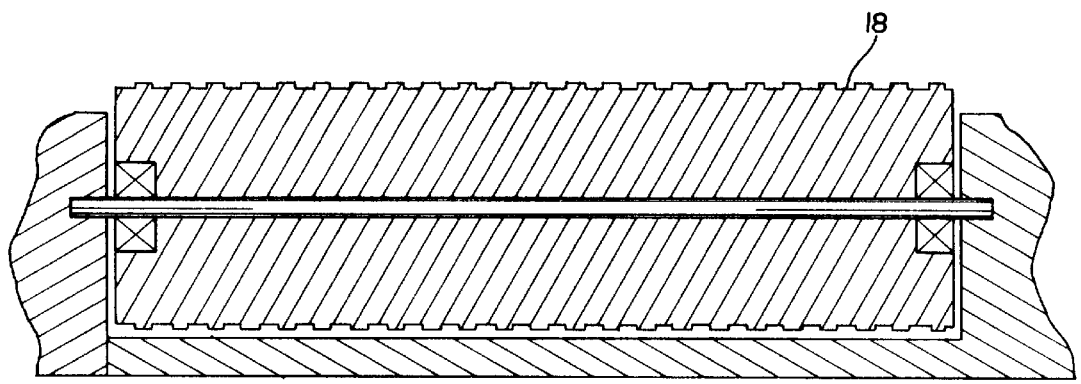
FIG. 5 is a cross-sectional view of one of the rollers of the present invention taken along line 5—5 shown in FIG. 1.
Figure 6:
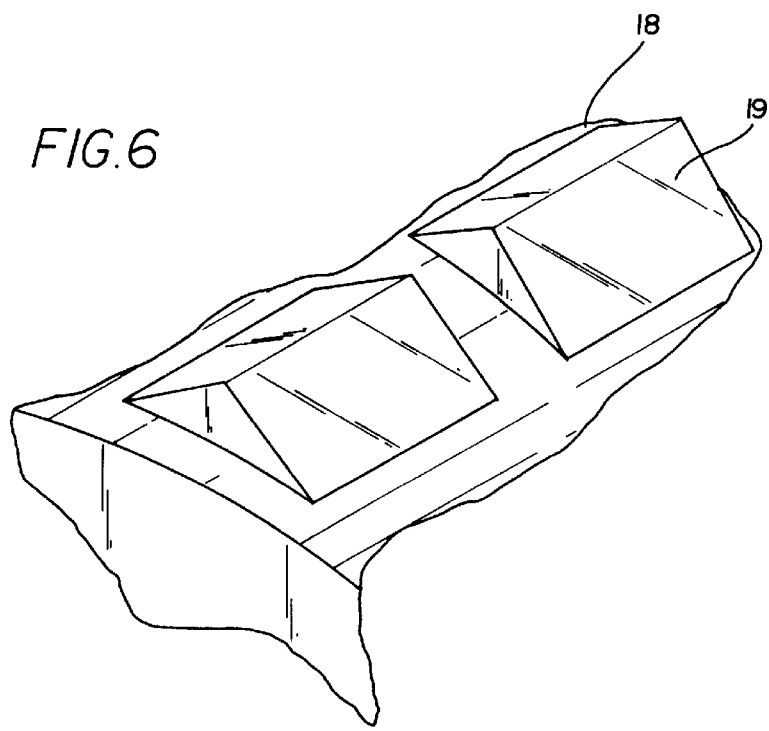
FIG. 6 is a detailed view of the tenderizing blades of the rollers of the present invention.

The present invention, designated as numeral 10, includes a base 12 having a rectangular configuration with a bottom face 14 and a rectangular side wall 16. The side wall is coupled to a periphery of the bottom face and extends upwardly therefrom for defining an interior space and an open top. Further, the side wall is formed of a pair of elongated side faces and a pair of short end faces. The base includes three cylindrical rollers 18 rotatably coupled between the side faces of the side wall. As such, the rollers of the base remain in a parallel side-by-side relationship and extend slightly above the open top of the base. As shown in FIG. 5, each roller is lined with a plurality of tenderizing blades 19.

Figure 2:
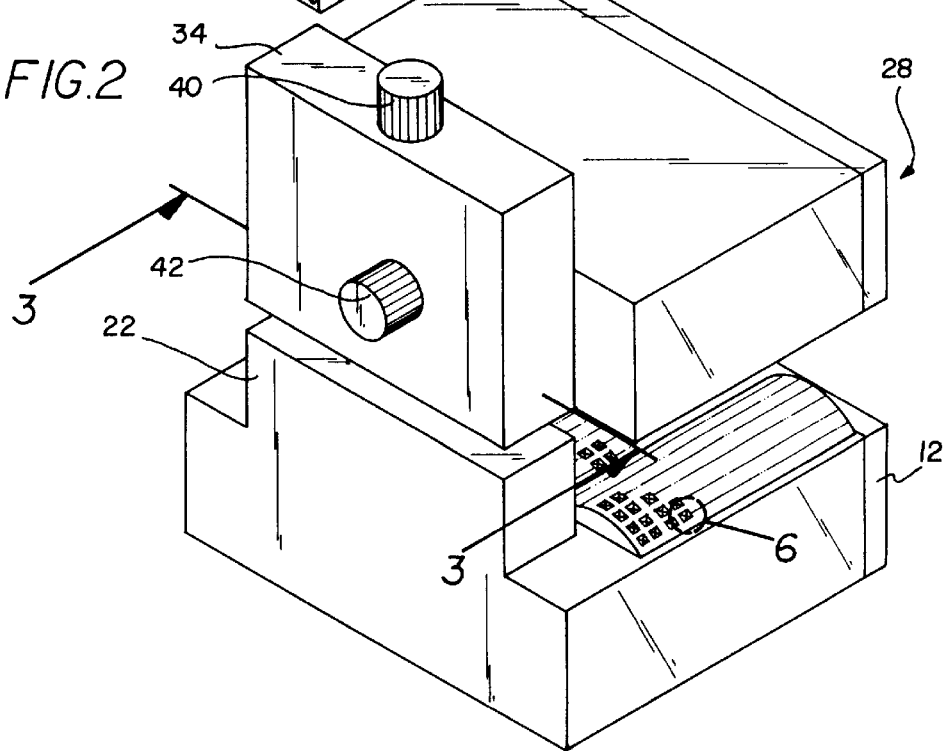
FIG. 2 is a rear perspective view of the present invention.

As shown in FIG. 4, the base further includes a suction cup 20 coupled on each of four bottom corners thereof. The suction cups function for securing the base to a horizontal recipient surface. With reference now to FIG. 2, a mounting block 22 is shown to be integrally coupled to an upper edge of one of the side faces of the base and further extended upwardly therefrom. The mounting block has a pair of vertically oriented posts 24 coupled to a top face thereof. For reasons that soon will become apparent, a threaded bore 26 is formed in the top face of the mounting block between the posts.

Next provided is an upper roller assembly 28 having a rectangular configuration with a top face and a rectangular side wall coupled to a periphery of the top face. Such side wall depends from the top face for defining an interior space and an open bottom. Further, the side wall of the upper roller assembly is defined by a pair of elongated side faces and a pair of short end faces, similar to that of the base.

The upper roller assembly also includes a plurality of cylindrical rollers 30 rotatably coupled between the side faces of its side wall. The rollers of the upper roller assembly remain in a parallel side-by-side relationship and rotate coincidentally. This is accomplished by way of a pair of disk-shaped gears 32 rotatably coupled to one of the side faces of the upper roller assembly. These gears have outer teeth which engage teeth formed on an end portion of each of the rollers. As shown in FIG. 1, the rollers of the upper roller assembly depend slightly below the open bottom of the upper roller assembly.

Similar to the rollers of the base, each of the present rollers are lined with a plurality of the tenderizing blades 19. In the preferred embodiment, each of the tenderizing blades has a constant triangular shaped cross-section along an entire length thereof. Further, an apex of each tenderizing blade is situated in parallel with an axis of the associated roller. Note FIG. 6.

As best shown in FIGS. 2.&3, the upper roller assembly further includes a control unit 34 with a rectangular hollow housing mounted on one of the side faces of the upper roller assembly. This housing has a pair of apertures 36 formed therein for slidably receiving the posts of the base. By this structure, the upper roller assembly is maintained above the base. A vertical adjustment rod 38 is rotatably coupled between a top face and a bottom face of the housing. Such vertical rod is equipped with a lower threaded extent that extends through the bottom face. As shown in FIG. 3, this threaded lower extent is adapted for screwably engaging the threaded bore of the base which, in turn, allows the rollers of the upper roller assembly to be selectively raised lowered with respect to those of the base. This is accomplished by the rotation of a first dial 40 coupled to the rod and extends upwardly from the top face of the housing.

The upper roller assembly further includes a second dial 42 in communication with at least one of the rollers or disk-shaped gears of the upper roller assembly for rolling the same. In use, a piece of meat that is situated between the rollers of the base and the upper roller assembly may be tenderized. The adjustable nature of the upper assembly is adapted for accommodating meats of various thickness. It should be noted that, in an alternate embodiment, the second dial is may be replaced with a motor for effecting the automatic rotation of the rollers during use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A meat tenderizing apparatus comprising, in combination:

a base having a rectangular configuration with a bottom face and a rectangular side wall coupled to a periphery of the bottom face and extending upwardly therefrom for defining an interior space and an open top, the side wall defined by a pair of elongated side faces and a pair of short end faces, the base including a plurality of cylindrical rollers rotatably coupled freely between the side faces of the side wall such that the same remain in a parallel side-by-side relationship and extend slightly above the open top of the base, each roller being lined with a plurality of tenderizing blades, the base further including a suction cup coupled on each of four bottom corners thereof for securing the base to a horizontal recipient surface and a mounting block integrally coupled to an upper edge of one of the side faces and extending upwardly therefrom, the mounting block having a pair of vertically oriented posts coupled to a top face thereof and extending upwardly therefrom and a threaded bore formed in the top face between the posts;

an upper roller assembly having a rectangular configuration with a top face and a rectangular side wall coupled to a periphery of the top face and depending therefrom for defining an interior space and an open bottom, the side wall of the upper roller assembly defined by a pair of elongated side faces and a pair of short end faces, the upper roller assembly further including a plurality of cylindrical rollers rotatably coupled freely between the side faces of the side wall of the upper roller assembly such that the same remain in a parallel side-by-side relationship, rotate coincidentally and depend slightly below the open bottom of the upper roller assembly, each roller being lined with a plurality of tenderizing blades;

said upper roller assembly further including a control unit including a rectangular housing mounted on one of the side faces of the upper roller assembly, the housing having a pair of apertures formed therein for slidably receiving the posts of the base for maintaining the upper roller assembly above the base and a vertical adjustment rod rotatably coupled between a top face and a bottom face of the housing with a lower threaded extent extending through the bottom face for screwably engaging the threaded bore of the base and further allowing the rollers of the upper roller assembly to be selectively raised lowered with respect to those of the base by the rotation of a first dial coupled to the rod and extending upwardly from the top face of the housing, the upper roller assembly further including a second dial in communication with at least one of the rollers of the upper roller assembly for rolling the same, thereby tenderizing a piece of meat situated between the base and the upper roller assembly.

2. A meat tenderizing apparatus comprising:

a base having an open top;

the base including a plurality of rollers rotatably mounted therein adjacent the open top of the base;

each of the rollers of the base having a plurality of tenderizing blades;

the base having a mounting block upwardly extending therefrom adjacent the open top of the base;

the mounting block having a pair of posts upwardly extending therefrom and a threaded bore therein between the posts;

an upper roller assembly having an open bottom;

the upper roller assembly having a plurality of rollers rotatably mounted therein adjacent the open bottom of the upper roller assembly;

each of the rollers of the upper roller assembly having a plurality of tenderizing blades;

a housing mounted to the upper roller assembly, the housing having a pair of apertures slidably receiving the posts of the base to maintain the upper roller assembly above the base such that the open bottom of the upper roller assembly faces the open top of the base;

the housing having a vertical adjustment rod rotatably mounted thereto, the vertical adjustment rod having a lower threaded extent downwardly extending from the housing and threadably inserted into the threaded bore of the base for allowing the rollers of the upper roller assembly to be selectively raised and lowered with respect to the rollers of the base by the rotation of the vertical rotation rod.

3. The meat tenderizing apparatus of claim 2, wherein the base comprises a bottom face and a side wall upwardly extending from the bottom face of the base to define the open top of the base.

4. The meat tenderizing apparatus of claim 2, wherein the rollers of the base each have a portion upwardly extending from the open top of the base, and wherein the rollers of the upper roller assembly each have a portion downwardly depending from the open bottom of the upper roller assembly.

5. The meat tenderizing apparatus of claim 2, wherein the base has a plurality of a plurality of downwardly depending suction cups for securing the base to a recipient surface.

6. The meat tenderizing apparatus of claim 2, wherein a first dial is coupled to the vertical adjustment rod and extends upwardly from the housing to permit rotation of the vertical adjustment rod therewith.

7. The meat tenderizing apparatus of claim 2, further comprising a second dial in communication with at least one of the rollers of the upper roller assembly for rotating the roller of the upper roller assembly upon rotation of the second dial.

* * * * *